Feb. 14, 1939.  H. A. BUDIN  2,146,933
ORTHOPEDIC TRACTION APPARATUS
Filed July 10, 1935  4 Sheets-Sheet 1
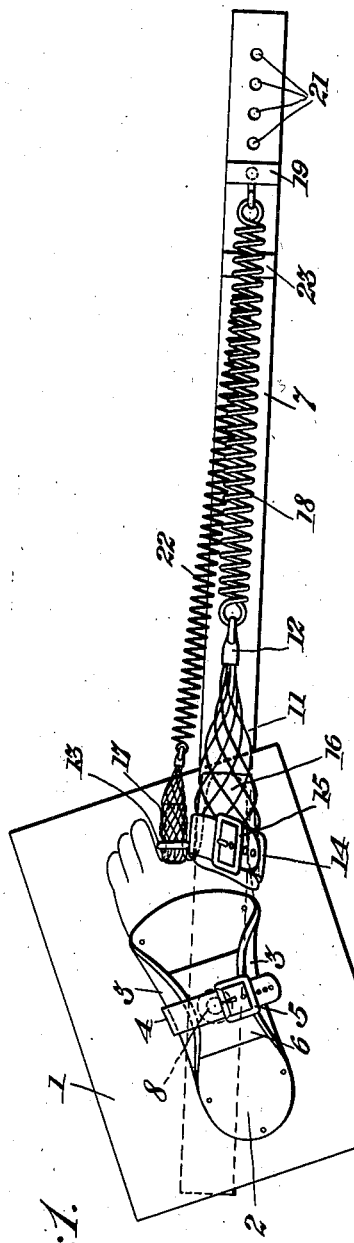
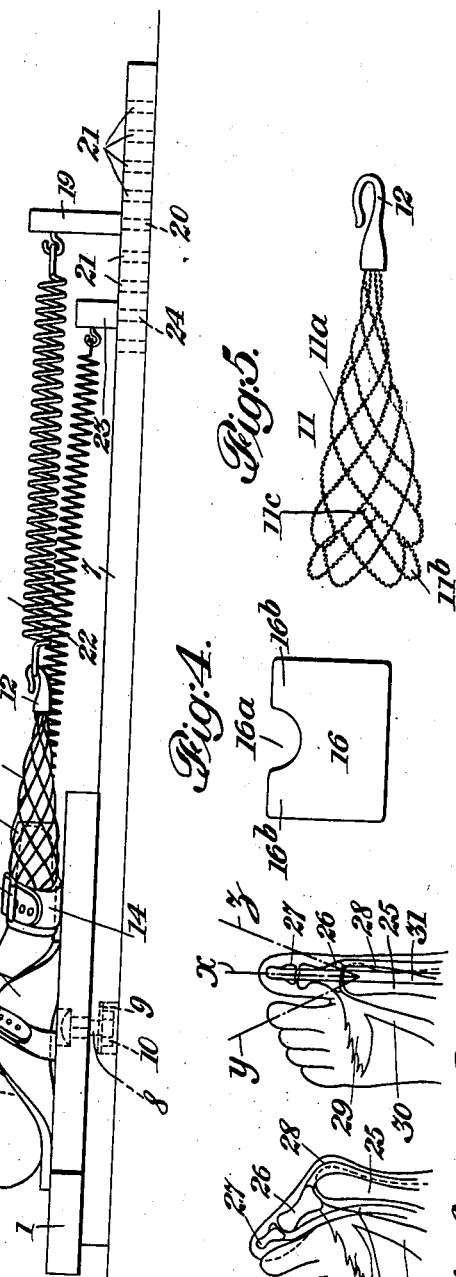
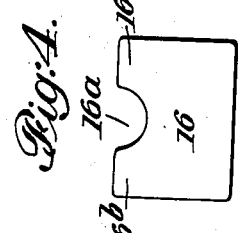
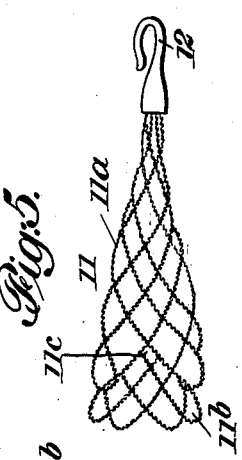
INVENTOR
Harry A. Budin
ATTORNEY

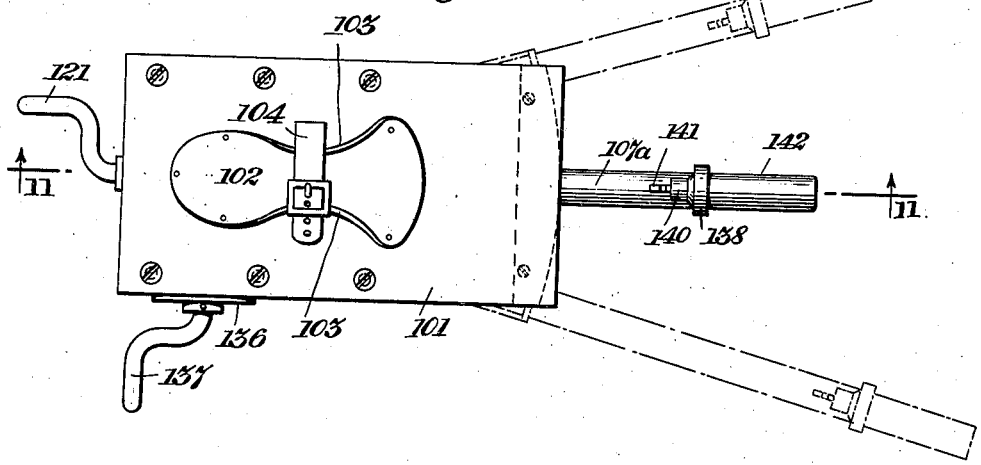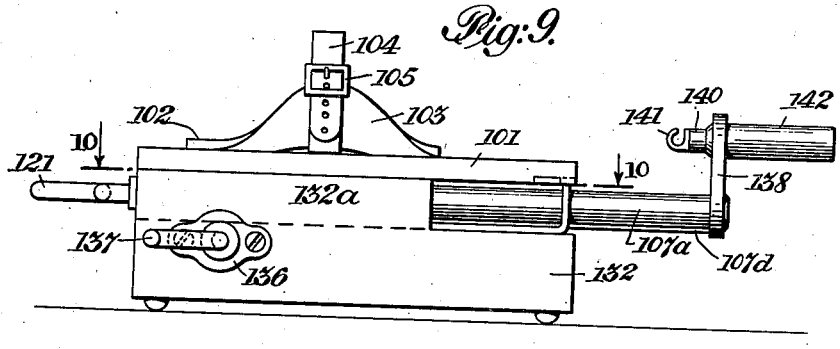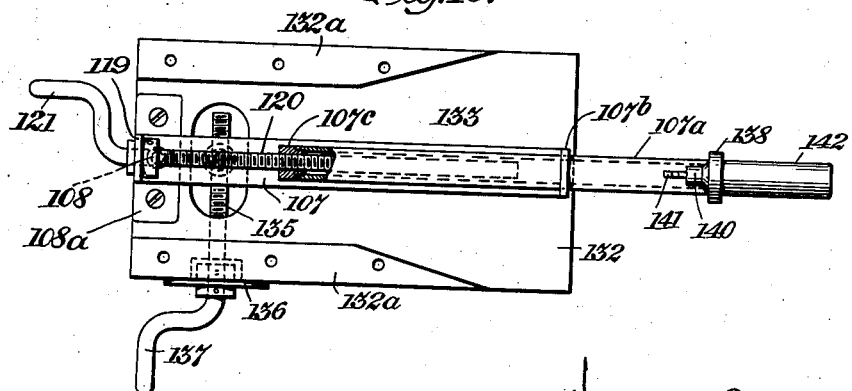

Feb. 14, 1939.    H. A. BUDIN    2,146,933
ORTHOPEDIC TRACTION APPARATUS
Filed July 10, 1935    4 Sheets-Sheet 3
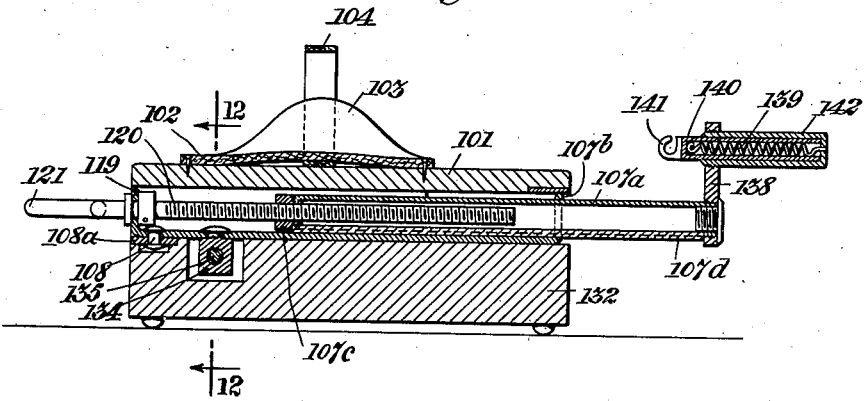
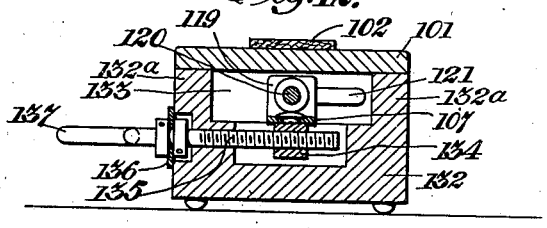
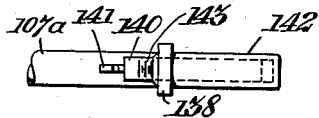
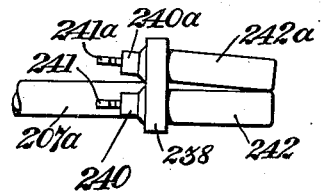

Feb. 14, 1939.  H. A. BUDIN  2,146,933
ORTHOPEDIC TRACTION APPARATUS
Filed July 10, 1935  4 Sheets-Sheet 4

Patented Feb. 14, 1939

2,146,933

UNITED STATES PATENT OFFICE 2,146,933

ORTHOPEDIC TRACTION APPARATUS

Harry A. Budin, New York, N. Y.

Application July 10, 1935, Serial No. 30,743

14 Claims. (Cl. 128—81)

My invention consists in the novel features hereinafter described, reference being had to the accompanying drawings, which show several embodiments of my invention, selected by me for purposes of illustration, and my said invention is fully disclosed in the following description and claims.

This application is a continuation in part of my former application for Letters Patent of the United States, filed March 29th, 1933, and given Serial Number 663,283, now Patent Number 2,033,609.

My invention relates to apparatus for treating a digital member or members of the hand or foot, by the application thereto of tractive force capable of being applied at any desired angle with respect to the hand or foot to which the member or members belong, for the correction of any desired form of deformation of the digital member or members, or the joints thereof, or the joints uniting them with the foot or hand. This apparatus is particularly efficacious in the treatment of bunion conditions, the straightening of arched, twisted or overlapping toes or fingers, and other distorted conditions of the hand or foot for which its use may be, or hereafter become, desirable or advantageous.

In the accompanying drawings, which illustrate several embodiments of my invention, I have shown it, particularly in certain figures thereof, as applied to a foot for the treatment of what is termed a bunion condition, but it is to be understood that it is equally applicable for the treatment of any other foot or hand conditions in which its use may be found desirable.

As this application is addressed to those skilled in the art to which my invention relates, it will be unnecessary for me to describe the causes or varied results of the condition ordinarily referred to by the term "bunion", except so far as it may be necessary for a clear understanding of my invention.

Briefly stated, the bunion condition ordinarily presents an inflammation and thickening on the inner side of the foot at the region of the great toe joint between the metatarsal bone and the proximal phalanx, which is accompanied ordinarily by marked deviation of the toe outwardly, that is, in a direction away from the center line of the body, with a corresponding departure from normal of the muscles and tendons controlling the toe. There is obviously a stretching of the soft structures on the inner side of the first metatarso phalangeal joint, the contraction or shortening of the similar structures on the outer side of the joint, together with a shortening of the long extensor and flexor muscles, acting on the toe, and extending respectively along the top and bottom of the toe and metatarsal bone. These extensor and flexor muscles normally lie substantially parallel with the longitudinal axis of the toe, and when the toe is deflected outwardly, they frequently become displaced so that they act like the string of a bow in tending to hold the toe in the deflected position, and also to force the aforesaid joint inwardly, thus pressing the head of the first metatarsal bone in a direction away from the corresponding joints of the other toes, it is to be understood that the words outwardly and inwardly as used in this specification refer respectively to directions away from and toward the center or median line of the body.

In some instances the outward deflection of the great toe may be sufficient to bring it over or under the adjacent toe, and in some instances the adjacent or second toe is also deflected out of normal alignment. While this bunion condition occurs most frequently at the metatarsal phalangeal joint of the great toe, the same condition may occur at the corresponding joint of the little toe. For convenience, I have shown and described the application of my invention to the bunion condition of the great toe, but it will be clearly apparent that it is equally applicable to a similar condition at the opposite side of the foot, and to the intermediate toes, where deformed by arching (hammer toe), twisting in overlapping, and that it is equally applicable to like conditions of the fingers of the hand.

In carrying out my invention, I provide an apparatus for applying traction to the affected toe longitudinally of its axis, and in some instances rotarily with respect to the same, at the same time pulling the phalanxes in an angular direction inwardly or outwardly with respect to the normal position of the toe. In some instances, also, traction may be simultaneously applied to an adjacent toe, or toes, where this is necessary. The effect of the traction is to stretch the contracted or shortened structures of the joint, as well as the shortened long extensor and flexor muscles, and relieve the over-stretched structures, at the same time permitting the toe to adjust itself rotarily with respect to its axis, if it has been distorted rotarily in the deflected position, and where necessary the traction may be applied with a twisting or rotary effect in the desired direction, to facilitate this adjustment.

Upon the release of the traction, the toe tends to resume a position nearer to, or in alignment with, its true position with respect to its longitudinal axis. I also provide means for holding the foot (or hand) against movement during the application of traction to the toe, or toes (or fingers) the foot or hand being maintained at the required angle to the direction of traction exerted upon the toe or finger. This is conveniently effected by mounting foot (or hand) securing means and the traction means pivotally with respect to each other, and adjusting either the foot securing means with respect to the traction means, or the traction means with respect to the foot securing means, to secure the desired angle of traction. Both arrangements are illustrated herein.

The apparatus can be employed to apply traction for any desired period, and is adjustable to provide any desired degree of traction, and both the period of treatment and degree of traction may be varied as may be, or become, desirable.

Referring to the accompanying drawings,

Fig. 1 represents a top plan view of a simple form of traction apparatus, embodying my invention, showing it applied to the great toe and also to the adjacent or second toe.

Fig. 2 is a side elevation of the same.

Fig. 3 is a detail of a clamping ring which may be used in connection with the toe grip.

Fig. 4 is a detail view of the compressible lining strip shown in connection with the toe grip.

Fig. 5 is a side elevation of the toe grip for the great toe illustrated in Figs. 1 and 2, looking at the side thereof nearer the center of the foot.

Fig. 6 is a diagrammatic view illustrating the relation of the toe bones and associated soft structures in the bunion condition.

Fig. 7 is a similar view illustrating the position of the same parts when restored to their substantially normal positions and functions.

Fig. 8 is a top plan view of a modified form of traction apparatus, two adjusted positions being illustrated in dotted lines.

Fig. 9 is a side elevation of the same.

Fig. 10 is a plan view, partly in section, of the apparatus shown in Figs. 8 and 9, with the top plate removed.

Fig. 11 is a vertical sectional view of the apparatus shown in Figs. 8, 9 and 10.

Fig. 12 is a transverse vertical section on line 12—12 of Fig. 11.

Fig. 13 is a partial view of the spring element showing the spring cylinder partly withdrawn from its casing and illustrating the traction scale.

Fig. 14 is a top plan view of a portion of a slightly modified form of the apparatus illustrated in Figs. 8 to 13, showing two separate spring elements.

Figure 15:
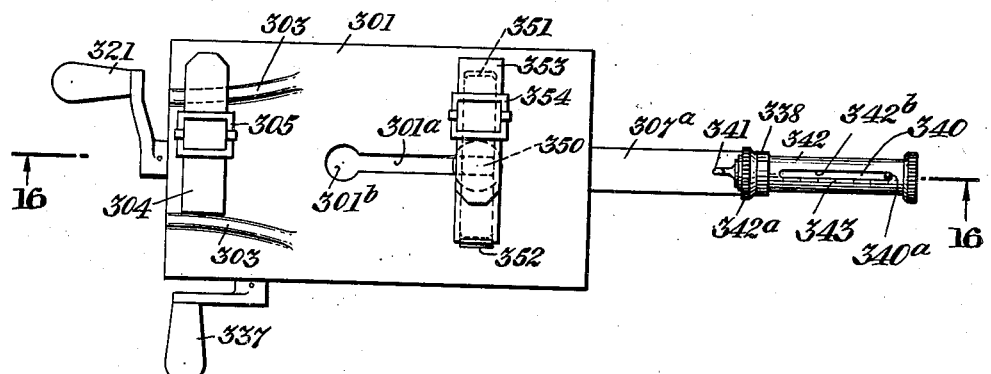
Fig. 15 is a top plan view of another slightly modified form of my invention.
Figure 16:
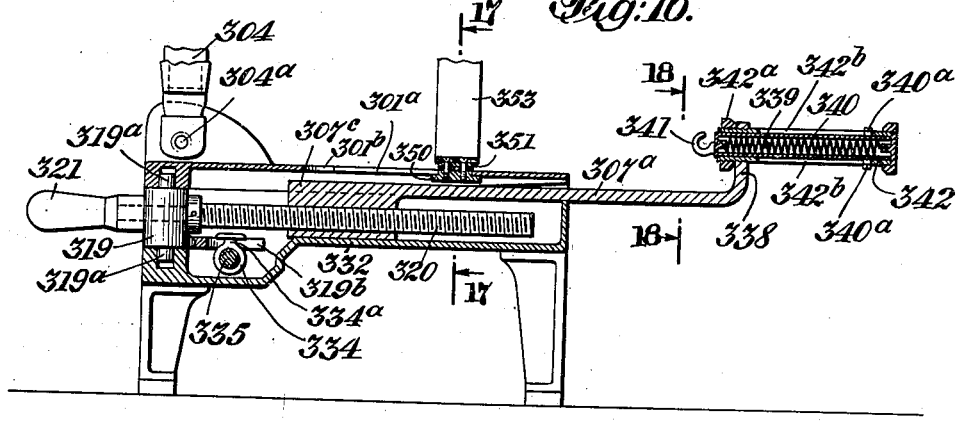
Fig. 16 is a vertical sectional view of the same.
Figure 17:
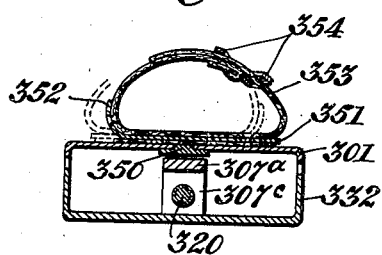
Fig. 17 is a transverse section on line 17—17 of Fig. 16.

In Figs. 1 to 5 inclusive, I have illustrated one form of apparatus which may be conveniently employed in carrying out my invention. In these figures, 1 represents a foot support, which in this instance is a rectangular plate or board provided with means for holding the foot firmly with its longitudinal axis in fixed position. For this purpose, there is shown a piece of leather 2, or other suitable flexible material, having a steel member secured rigidly to the base plate 1 and provided with oppositely disposed upwardly extending flexible side portions 3, 3 for engaging the opposite sides of the foot, in connection with an adjustable strap or band 4 extending outside of the side portions 3 and over the top of the foot, and in this instance provided with a buckle 5 for the adjustment thereof. I also prefer to provide the foot with a soft pad, indicated at 6, between it and the strap, as indicated in Figs. 1 and 2, and this pad, which is conveniently made of sponge rubber or other suitable material, may extend downwardly within the side pieces 3 so as to prevent injury to or the stoppage of circulation, in the foot, when the strap 4 is drawn up sufficiently tight to hold the foot firmly against any lateral movement. 7 represents a traction bar pivotally connected to the foot supporting plate 1 by means of a suitable pivot 8, shown in Fig. 2, comprising in this instance a bolt provided with a washer 9 and nut 10, so that the foot supporting plate 1 and traction bar 7 may be clamped in any desired angular relation to which they may be adjusted. In order to apply traction to the toe it is necessary to grip the toe, and this may be done by any suitable means which will not bruise or abrade the skin or interfere with the circulation of the blood. A convenient means for connecting the traction means with the toe is a flexible contractible toe grip shown in Figs. 1 and 2, and in detail in Fig. 5, and indicated generally by the number 11. This toe grip is similar in construction to finger grips of known type in which a plurality of strands are loosely braided together in a substantially cylindrical form, so that a pull on the strands in a longitudinal direction produces a contraction of the diameter of the braided cylinder and clamps it upon a digital member which it encloses. In the specific form of grip which I find it convenient to employ, the strands, indicated at 11a, are formed of metal wire, and the ends are united to a hook or attaching member 12 at one end of the device. At the other end of the device, which is of sufficient internal diameter to be passed over the toe (or finger), the braided strands are formed in terminal loops, indicated at 11b, and at one point corresponding to the outer side of the great toe, for example, adjacent to the second toe, a V-shaped notch is formed, as indicated at 11c to accommodate what might be termed the web or fleshy portion between the toes, which permits the terminal loops 11b on the inner side of the toe to extend rearwardly to a greater extent than would be possible at the outer side of the toe. As the portion of the gripping device actually in engagement with the toe is necessarily short, I find it desirable in some instances to compress the terminal loops 11b upon the base of the toe in order to insure the proper clamping action of the grip. This may be accomplished by means of a ring 13 of rubber, for example, as indicated in Fig. 1, on the second toe, and illustrated in detail in Fig. 3, or I may employ a strap 14 as shown, in connection with the great toe, in Figs. 1 and 2, surrounding the terminal portions of the grip, and provided with a buckle 15 for adjustment.

Obviously the digital grips will be provided in desired sizes or diameters to accommodate the various digital members to be treated, and to further accommodate variations in the size of such members where necessary.

In order that the circulation in the toe may not be impaired during the application of traction thereto, I preferably provide a yielding pad to surround the toe within the braided cylindrical toe grip. As the braided toe grip decreases in diameter when subjected to longitudinal strain the wire strands tend to embed themselves into the flesh, especially when considerable tractive force is applied to the grip. The pad must, therefore, be composed of a material which will act as a cushion between the wires and the flesh, so as to prevent injury to the skin, and such constriction of the toe as would interfere with the proper circulation of the blood, while at the same time it must transmit the lateral pressure of the toe grip and insure the required frictional engagement between the grip and the pad and between the pad and the toe as to prevent the grip from being pulled away from the toe. This pad is preferably made of sponge rubber of suitable thickness, and in the form illustrated in Fig. 4, in which it is designated by the numeral 16. The pad 16 is cut out at one edge, as indicated at 16a, to form a recess which engages the web portion of the foot between the toes, thus allowing the adjacent parts 16b, 16b to extend further toward the body of the foot (or hand) than would be otherwise possible, and acting in conjunction with the similarly constructed grip to carry the gripping means toward the body of the foot further than would otherwise be possible. In Fig. 1, for example, I have shown the toe grip 11 applied to the great toe in the manner previously described, and I have shown a smaller sized toe grip, indicated at 17, applied to the second toe, assuming that it is also laterally deflected and in need of correction. It will be understood that the grip 17 is also provided with a pad 16, which may be cut away or notched at two opposite edges if desired, and as before stated, the grip is provided with the elastic ring 13 adjacent to its terminal loops.

For applying the desired traction continuously over a predetermined period, I preferably employ a coil spring, although obviously a weight secured to a cord and passing over a pulley could be used, if desired. In Figs. 1 and 2 I have shown a spring 18 connected at one end to the hook 12 on the toe grip 11, 11 and at the other end to a post 19, which is adjustable on the traction bar 7, longitudinally thereof, being in this instance provided with a stud 20 adapted to engage one or other of a longitudinal series of holes or sockets 21. I have also shown in these figures, a second spring 22, which in this instance is a lighter spring, connected at one end to the toe grip 17 on the second toe, and having its opposite end connected with a similar post 23, provided with a stud 24 engaging one or other of the adjusting holes or sockets 21. It will be obvious that springs of various strengths or sizes may be employed to obtain the desired result and that these springs may be adjusted longitudinally to increase or decrease the amount of tension.

In Fig. 6 I have shown, diagrammatically, the relation of the bones of the great toe and associated structures, with the phalanxes deflected outwardly and illustrating the bunion condition. In this figure, 25 represents the first metatarsal bone, 26 the proximal phalanx, and 27 represents the distal phalanx. The soft structures along the inner side of the foot, which are over-stretched, are indicated at 28. The shortened structures on the outer side of the joint are indicated at 29 and 30, and the position of the long extensor muscle is shown at 31. The corresponding flexor muscle will have substantially the same position on the bottom of the foot, but is not visible in this figure. When the toe is subjected to traction, the traction is exerted as previously stated, at an angle to the joint on the opposite side of the longitudinal axis of the toe from the distorted position of the toe. Thus, for example, in Fig. 7, the normal position of the toe axis is indicated by the dotted line $x$, and the dotted line $y$ indicates the distorted position of the axis of the great toe. The dotted line $z$ indicates approximately the angular direction of the traction applied to the toe, which pulls it inwardly considerably beyond the normal position indicated by the dotted line $x$. It will be seen from a comparison of these two figures that the effect of the traction is necessarily to relieve the over-stressed condition of the lateral structures 28, and to extend the contracted oppositely disposed structures 29 and 30, together with the long extensor and flexor muscles, so that after this traction has been continued for the desired period, and the toe is released, it will return to a position nearer to the normal position $x$, and as a result of successive treatments, will eventually be substantially restored to the normal position and function.

In Figs. 8 to 14, inclusive, I have shown a slightly modified form of apparatus for applying traction to the digital members of the hand or foot. In these figures corresponding parts will be given the same reference numerals with the addition of 100. In these figures, 101 represents the foot supporting plate, which is provided with the leather piece 102, having the foot retaining side portions 103 and strap 104 substantially as previously described, or obviously any other foot retaining means could be employed. In this instance the plate 101 is secured to a supporting member 132 having upwardly extending side portions 132a to which the plate 101 is secured, and leaving a recess below said plate, indicated at 133. 107 indicates the traction bar, which is pivoted at its rear end at 108, to a plate 108a secured to the base 132. This traction bar is provided with an extension member, indicated at 107a, which is conveniently made in tubular form, sliding through a guide 107b on the bar 107, and provided at its rear end with a nut 107c engaged by a screw shaft 120 mounted in a bracket 119 at the inner end of the bar 107, and provided with a handle 121, or other suitable means for turning. By means of this screw shaft, the extension bar 107a can be moved outwardly or inwardly. In this instance I have shown the traction bar 107 provided at a point forward of its pivotal point with a nut 134 pivotally secured to the bar 107 and engaged by a transversely disposed screw shaft 135 secured to the side of the base 132 by a plate 136 against longitudinal movement. This shaft is also provided with a handle 137, or other means for turning it, and it will be seen that by rotating this shaft 135 in one direction or the other, the traction bar, and its extension 107a, may be swung laterally into any desired angular position with respect to the longitudinal axis of the foot retaining means. The extension 107a is provided in this instance on its lower side with a longitudinal key 107d engaging a corresponding recess in the guide 107b to prevent it from turning.

The extension 107a of the traction bar is provided at its outer end with a vertically disposed bracket 138 which carries a traction spring, indicated at 139 in Fig. 11. I find it convenient to locate this spring within a cylinder 140 provided with a hook or loop 141 and sliding within a fixed cylinder or guide 142 secured to the bracket 138. The spring is connected at one end to the inner end of the cylinder 140 and has its other end connected to the guide cylinder 142, and the exterior of the cylinder 140 is provided with a scale, indicated at 143, see Fig. 13. It will be understood that the toe grip will be connected with the hook or loop 141, and that the traction bar and its extension member will be swung to the desired angle previously described, by means of the screw shaft 135 and the extension projected longitudinally by means of the screw shaft 120 to bring about the desired spring pressure, which will be indicated by the scale 143.

In Fig. 14, in which the parts illustrated in Figs. 1 to 5 are given the same reference numerals with the addition of 200, I have shown the extension member 207a, provided with a bracket 238, which carries two guide cylinders 242 and 242a, each provided with a spring mechanism similar to that illustrated in Fig. 11, one of which can be connected with one digital member and the other to the adjacent digital member, the said spring mechanisms being held in the bracket 238 at an angle to each other, if desired, as shown in Fig. 14, to facilitate the application of traction to two digital members at the same time, at the same or different degrees of traction.

It will be understood that the effect of traction of a distorted digital member by either of these mechanisms herein described, or in any other way, in addition to its effect in permitting the relaxation of the over-stretched structures, and the corresponding stretching of the structures on the opposite face of the digital member, and the restoration of the long extensor and flexor muscles to positions in substantial alignment with the axis of the digital member, produces a slight separation of the proximal phalanx, from the articulated metatarsal bone, which facilitates the lateral or rotary movement of the phalanxes, or both lateral and rotary movements, as may be necessary, with respect to the metatarsal bone, to enable the bones of the toe to resume substantially their correct and normal relations with respect to the longitudinal axis of the toe.

In Figs. 15 to 19 inclusive, in which the parts corresponding with those shown in Figs. 1 to 5 are given the same reference characters, with the addition of 300, I have shown a slightly modified embodiment of my invention. In these figures the top plate 301 is provided adjacent to its rear end with stationary vertically disposed flanges 303 formed integrally therewith, or secured thereto, and having strap members 304 pivotally connected therewith, as indicated at 304a, and connected by a suitable buckle 305 or other adjusting means. The plate 301 is also provided in this instance with a longitudinally disposed slot 301a having an enlarged, substantially circular portion 301b at its rear end. This slot is adapted to be engaged by a longitudinally disposed slide 350 of substantially the same width as, but of greater length than, the width of the slot, the length of this slide being such that it can be rotated by moving the slide back along the slot 301a and into the enlarged aperture 301b, as will be readily understood. This carries an auxiliary holding means, comprising a transversely disposed plate 351 secured to the slide, and preferably having one end curved upwardly, as indicated at 352. A strap member 353 is riveted or otherwise secured to the plate 351 and provided with a buckle 354, or other adjustable take-up means. When this device is used for treatment of the toes of the foot, the portion of the foot adjacent to the heel, is inserted between the flanges 303 and secured by the strap members 304 over the instep. The auxiliary holding means will engage the forward portion of the foot with the upturned flange 352 on the inner side of the foot. The slot 301a permits the adjustment of the auxiliary holding means longitudinally, if desired, and permits the auxiliary device to be moved backward until its slide engages the enlargement 301b, when the device may be turned around, and in this way it is adapted for use with either the right or left foot.

Obviously if a digital member of the hand is to be treated, the arm adjacent to the wrist will be secured between the flanges 303 with the body of the hand secured in the auxiliary holding device in either of its adjusted positions, as may be most convenient.

In this embodiment of my invention, the longitudinally disposed screw shaft 320 is mounted in an oscillating boss 319, provided at its upper and lower ends with pivotal portions 319a engaging pivotal apertures in the upper and lower plates 301 and 332, and this boss is provided with a forwardly extending yoke 319b. The screw shaft 320 is provided with an elongated nut 307c having a forwardly extending bar 307a formed integral with or secured thereto, the outer end of said bar being turned up vertically, at 338, and provided with a threaded aperture to receive a threaded portion of the exterior casing 342 of the tension device. The threaded portion of the casing 342 is provided with a set nut, indicated at 342a, to engage the turned up portion or bracket 338. This arrangement permits the exterior casing 342 to be rotated in any desired degree with respect to the bracket 338. The casing 342 is in this instance provided with a slot 342b and the interior spring casing 340 which carries the hook or attaching member 341 is provided with a pin or guide 340a extending into said slot, and in this instance forming a pointer operating in conjunction with a scale 343 marked on the outer casing adjacent to said slot 342b. The engagement of the pointer or guide 340a with the slot 342b holds the inner and outer casings against relative rotation. If desired, the exterior casing may be provided with an additional slot 342b on the side opposite the first mentioned slot engaged by a second guide pin 340a secured to the inner casing, if this is found necessary.

Figure 18:
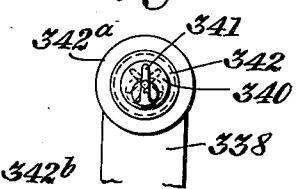
Fig. 18 is a detail sectional view on line 18—18 of Fig. 16.
Figure 19:
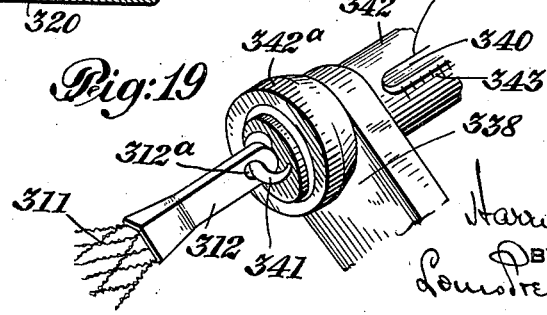
Fig. 19 is a detail perspective view showing the tractor spring casing adjusted rotarily for the purpose of producing a twisting or rotary effect on the digital member under treatment.

It will be understood that by loosening the set nut 342a the exterior casing can be rotated so as to place the hook portion 341 in any desired angular position, as indicated in Fig. 18, and the exterior casing 342 may be locked in any rotarily adjusted position by turning up the set nut. As shown in Fig. 19, the gripping device, indicated at 311, is provided with an attaching part 312, having an aperture 312a therein, to engage the hook 341 of the spring mechanism, so as to prevent relative rotary movements of said parts. The gripping device will therefore be rotated with the spring mechanism when the latter is rotarily adjusted, as hereinbefore described.

This construction will be found especially convenient where the digital member under treatment has become distorted rotarily. In such case the gripping device may be attached to the digital member with the hook of the spring mechanism in a predetermined position, as for example, the position shown in full lines in Fig. 18, whereupon the set nut may be loosened and the spring mechanism rotated in a direction opposite to the rotary direction of distortion of the digit under treatment, so that when the traction is applied, in the manner previously described by means of the screw shaft 320, the tension of the spring will not only pull longitudinally on the digital member, but will also tend to rotate it in a direction toward or beyond its normal position, and thus facilitate the correction of the twist or rotary distortion of said digital member.

In order to apply the traction of the spring in the proper angular direction with respect to the foot or hand, the device is provided with transversely disposed screw shaft, indicated at 335, engaging a nut 334 which is provided with a pin, stud or projection 334a engaging the yoke 319b. This will permit the oscillation of the boss 319, carrying with it the screw shaft 320 and traction bar 307a, and the spring mechanism carried thereby, so as to place it at the desired angular position with respect to the foot or hand held on the plate 301, as previously described.

What I claim and desire to secure by Letters Patent is:

1. Apparatus for applying traction to a digital member, comprising a support provided with means for securing a body member thereto, a traction bar pivotally secured to said support, and having a longitudinally adjustable portion, a spring traction device provided with a casing rotatably secured to the longitudinally adjustable portion of the traction bar, and having an attaching device held against rotary movement with respect to said casing, means for securing said casing in its rotarily adjusted positions, means for adjusting said traction bar transversely on its pivotal connection with said support, and a digital gripping device provided with means for connecting it with said attaching device, and holding it against rotary movement with respect thereto.

2. Apparatus for applying traction to a digital member, comprising a supporting plate provided with a longitudinal slot having an enlarged aperture, communicating therewith, a reversible device for engaging a body member provided with a slide engaging said slot, said slide being of a length slightly less than the diameter of said aperture, to permit the rotation of said slide therein, a traction bar having a pivotal engagement with said supporting plate, and having a longitudinally adjustable portion, a spring traction device carried by said longitudinally adjustable portion, a digital gripping device provided with means for connecting it with said spring traction device, and means for adjusting said traction bar transversely on its pivotal connection with said supporting plate.

3. Apparatus for applying traction to a digital member comprising a support provided with means for securing a body member thereto, an oscillating part pivotally connected with said support, and provided with an actuating part, a screw threaded adjusting shaft extending through said oscillating part, a longitudinally adjustable traction bar having a threaded portion engaging said screw shaft, a cylindrical tractor casing carried by said bar, and rotatable with respect thereto, a spring casing within said tractor casing, held against rotary movement with respect thereto, and provided with an attaching device, a spring interposed between said tractor casing and spring casing, adjustable means for locking said tractor casing against rotary movement, screw threaded adjusting means engaging said actuating part for swinging the traction bar laterally, and a digital gripping device provided with means for engaging said attaching device and holding said gripping device against rotary movement with respect thereto.

4. In apparatus for applying traction to the digital members of the foot, the combination of a stationary foot support, provided with means for securing the foot against movement with respect thereto, a longitudinally movable traction member, provided with a revoluble attaching part, and means for locking it against rotation, means for effecting the longitudinal movement of said traction member, and toe gripping means provided with attaching means for engaging said revoluble attaching part of the traction member, whereby said toe gripping means may be rotated with the toe and said attaching part, and said attaching part may be secured in adjusted position to apply traction and torsional stress to the toe simultaneously.

5. In apparatus for applying traction to the digital members of the foot, the combination of a stationary foot support provided with means for securing the foot against movement with respect thereto, a traction member adjacent to the forward end of said foot support, a spring casing supported rotatably with respect to and by said traction member, a spring in said casing, an attaching device operatively connected with said spring and held against rotation with respect to said casing, a toe grip provided with means for engaging said attaching device and preventing said toe grip from rotating with respect to said attaching device, and locking means for locking said spring casing against rotation with respect to said traction member, whereby said toe grip and the toe engaged thereby and said spring casing may be rotated with respect to the traction member and said casing locked, to apply torsional stress to the toe at the same time that the toe is subjected to longitudinal stress by said traction device.

6. Apparatus for applying traction to the digital members of the foot comprising a stationary support, provided with a foot supporting surface, means associated with said support for holding the heel against lateral and longitudinal movement with respect to said supporting surface, said supporting surface being provided with an auxiliary foot securing device extending transversely of said surface, and provided at one end with an upwardly extending portion to engage the inner side of the foot, said auxiliary device being pivotally connected with said support to permit its reversal to accommodate either foot, a toe grip, and means operatively connected with the stationary support and the toe grip for applying traction to said toe grip.

7. Apparatus for applying traction to the digital members of the foot comprising a stationary support, provided with a foot supporting surface, means associated with said support for holding the heel against lateral and longitudinal movement with respect to said supporting surface, said supporting surface being provided with a longitudinal slot forward of the heel supporting portion communicating with an aperture of greater diameter than said slot, a slide engaging said slot of a length permitting it to turn in said aperture, an auxiliary foot securing device rigidly secured to said slide, normally disposed transversely of said support, and having an upwardly extending portion at one end to engage the inner edge of the foot, said auxiliary foot securing device being reversible to accommodate either foot by moving said slide into its said aperture, a toe grip, and means operatively connected with the stationary support and the toe grip for applying traction to said toe grip.

8. In apparatus for applying traction to the digital members of the foot, the combination of a stationary support provided with a supporting surface for engaging the bottom of the foot, and provided with securing means for holding the foot against longitudinal and lateral movement with respect to said support, including means for engaging lateral portions of the foot adjacent to the connection of the toes therewith, a longitudinally disposed traction bar, having a pivotal relation with said support, for enabling it to be swung laterally with respect to the foot supporting means, a toe grip, connections from said toe grip to said traction bar including a traction spring, and means for effecting variations in the tractive force exerted by said spring on the toe grip and toe.

9. Apparatus for applying traction to a digital member, comprising a support provided with means for securing a body member thereto, an oscillating part pivotally connected with said support, a screw threaded adjusting shaft carried by said oscillating part, a longitudinally adjustable traction bar having a threaded part engaging said screw thread, a cylindrical tractor casing carried by said bar and adjustable rotatably with respect thereto, a spring casing within said tractor casing, a spring connecting said casings, screw threaded adjusting means for swinging the traction bar laterally, and a digital gripping device connected with said spring casing by means holding it against rotation with respect thereto.

10. In an apparatus for applying traction to the digital members of the foot, the combination of a stationary foot support, means for securing the foot against movement with respect thereto, a traction bar connected with said foot support and extending forwardly thereof, a support for a traction device connected to the traction bar adjacent to its outer end, a toe grip, a traction device connected at one end to the toe grip, and connected at the outer end to said traction device support on the traction bar, and means for adjusting the stress exerted on the toe grip by the traction device.

11. In an apparatus for applying traction to the digital members of the foot, the combination of a stationary support provided with securing means for holding the foot against movement with respect to said support, a longitudinally disposed bar secured to said support, a traction device carried by said bar and provided with a toe grip adjustable rotarily, and means for locking said toe grip in its rotarily adjusted position to impart torsional stress to the toe simultaneously with the longitudinal stress imparted by said traction device.

12. An apparatus for the treatment of hallux valgus, hammer toe and the like ailments of the foot, comprising among its members, a base adapted to rest on the floor, and to support the weight of the foot while under treatment, means for holding the foot against lateral and longitudinal movement while so supported, traction means connected to and adjustable with respect to said base so as to exert longitudinal traction at different angles with respect to the longitudinal axis of the foot, and means for connecting the traction means to a toe of the supported foot.

13. An apparatus for the treatment of hallux valgus, hammer toe and the like ailments of the foot, comprising among its members, a base adapted to rest on the floor and to support the weight of the foot while under treatment, means for holding the foot against lateral and longitudinal movement while so supported, traction means having a pivotal relation with said base and capable of being adjusted to different angular positions with respect to the longitudinal axis of the supported foot, means for securing said traction means in its adjusted position with respect to the supported foot, and a toe gripping means for connecting said traction means to a toe of the supported foot.

14. An apparatus for the treatment of hallux valgus, hammer toe and the like ailments of the foot, comprising among its members a base adapted to rest on the floor and provided with a support for engaging portions of the sole of a foot to support it during treatment, and securing means for holding the foot against longitudinal and lateral movement, including devices for engaging the side of the foot forward of the heel, a longitudinal traction bar having a pivotal relation with said base, means for locking said bar with respect to said support in different angular positions with respect to the longitudinal axis of the foot supported on said base, a toe grip, connections from said toe grip to said bar including a traction spring, and means for effecting variations in the tractive force exercised by said spring on the toe grip, and the toe engaged thereby, in a direction determined by the adjustment of said bar.

HARRY A. BUDIN.